(12) United States Patent
Kaye

(10) Patent No.: US 10,412,424 B2
(45) Date of Patent: Sep. 10, 2019

(54) MULTI-CHANNEL VARIABLE BIT-RATE VIDEO COMPRESSION

(75) Inventor: James E. Kaye, Pleasanton, CA (US)

(73) Assignee: Harmonic, Inc., San Jose, CA (US)

( * ) Notice: Subject to any disclaimer, the term of this patent is extended or adjusted under 35 U.S.C. 154(b) by 1070 days.

(21) Appl. No.: 13/276,581

(22) Filed: Oct. 19, 2011

(65) Prior Publication Data

US 2013/0101052 A1    Apr. 25, 2013

(51) Int. Cl.
| | |
|---|---|
| *H04N 7/00* | (2011.01) |
| *H04N 21/2365* | (2011.01) |
| *H04N 19/169* | (2014.01) |
| *H04N 19/115* | (2014.01) |
| *H04N 19/154* | (2014.01) |
| *H04N 19/85* | (2014.01) |
| *H04N 19/436* | (2014.01) |
| *H04N 19/87* | (2014.01) |

(52) U.S. Cl.
CPC ..... *H04N 21/23655* (2013.01); *H04N 19/115* (2014.11); *H04N 19/154* (2014.11); *H04N 19/169* (2014.11); *H04N 19/85* (2014.11); *H04N 19/436* (2014.11); *H04N 19/87* (2014.11)

(58) Field of Classification Search
CPC .............................................. H04N 21/23655
USPC ........................................... 375/240–240.26
See application file for complete search history.

(56) References Cited

U.S. PATENT DOCUMENTS

| | | | |
|---|---|---|---|
| 6,167,084 A | 12/2000 | Wang et al. | |
| 6,940,901 B2 | 9/2005 | Kato | |
| 7,302,000 B2 | 11/2007 | Chen | |
| 7,346,106 B1 * | 3/2008 | Jiang et al. | 375/240.12 |
| 7,343,291 B2 | 11/2008 | Thumpudi et al. | |
| 2006/0050970 A1 | 3/2006 | Gunatilake | |
| 2010/0189183 A1 * | 7/2010 | Gu et al. | 375/240.28 |

(Continued)

FOREIGN PATENT DOCUMENTS

WO    WO 2010060463 A1 *   6/2010

OTHER PUBLICATIONS

International Search Report and Written Opinion from International Application No. PCT/US2011/056925 dated Apr. 27, 2012, 7 pages.

(Continued)

*Primary Examiner* — Jonathan R Messmore
(74) *Attorney, Agent, or Firm* — Brokaw Patent Law PC; Christopher J. Brokaw

(57) ABSTRACT

Systems, method, and computer program products for providing multi-channel variable bit-rate video compression are described. In some implementations, video channels can be allocated with bit rates that are set based on a predefined video compression quality. More specifically, each channel can generate a table describing the set of video compression quality values each corresponding to a bit rate value that can be used to achieve that video compression quality value. To generate the table or pre-compression coding information, encoders of the system described herein can pre-encode each input signal at multiple, different bit rates, and record the video compression quality value achievable at each of the bit rates. The system also can use lesser number of encoders for pre-encoding, supplemented by data interpolation, to generate the pre-compression coding information, requiring less processing algorithm but at an expense of lower accuracy.

26 Claims, 3 Drawing Sheets

(56) References Cited

U.S. PATENT DOCUMENTS

2010/0284295 A1\* 11/2010 Yamagishi et al. ........... 370/252
2011/0150074 A1 6/2011 Limin et al.
2011/0235654 A1\* 9/2011 Jones et al. ................... 370/465

OTHER PUBLICATIONS

U.S. Appl. No. 11/944,305, filed Nov. 21, 2007, Multiple-pass Variable Bit-Rate Encoding System, Eric Reed, et al.

\* cited by examiner

MULTI-CHANNEL VARIABLE BIT-RATE VIDEO COMPRESSION

TECHNICAL FIELD

The subject matter of this application is generally related to video and image processing.

BACKGROUND

Transmission of video data with existing communication channels can require a significant amount of bandwidth. Data compression is an approach that has been used to make digital video images more transportable over these channels. Specifically, digital video compression allows digitized video data to be represented in a much more efficient manner and makes it possible to transmit the compressed video data using a channel at a fraction of the bandwidth required to transmit the uncompressed video data.

An example of a data compression technique is the Moving Picture Experts Group (MPEG) standard. MPEG sets forth standards for data compression and may be applied to various signals such as audio and video. Data compression allows gaps, empty fields, redundancies, and unnecessary data to be removed to shorten the length of the data, thereby providing better bandwidth utilization and making more efficient use of channel bandwidth and storage media.

SUMMARY

Systems, method, and computer program products for providing multi-channel variable bit-rate video compression are described. In some implementations, video channels can be allocated with bit rates that are set based on a predefined video compression quality. More specifically, each channel can generate a table describing the set of video compression quality values each corresponding to a bit rate value that can be used to achieve that video compression quality value. To generate the table of pre-compression coding information, encoders of the system described herein can pre-encode each input signal at multiple, different bit rates, and record the video compression quality value achievable at each of the bit rates. The system also can use a lesser number of encoders for pre-encoding, supplemented by data interpolation, to generate the pre-compression coding information, requiring less processing algorithm but at an expense of lower accuracy.

In some implementations, a system can be provided that includes a plurality of encoders each receiving a channel of program content, each encoder providing pre-compression coding data identifying a relationship between one or more bit rates and corresponding video compression quality levels; and a controller that: receives the pre-compression coding data identifying the relationships; determines a total bit rate available; identifies a highest video compression quality level based on the pre-compression coding data and the total bit rate available; and controls the plurality of encoders based on the identified highest video compression quality level.

In some implementations, a method can be provided that includes receiving pre-compression coding data identifying a relationship between one or more bit rates and corresponding video compression quality levels; determining a total bit rate available for encoding one or more channels of program content; identifying a highest video compression quality level based on the pre-compression coding data and the total bit rate available; and controlling a plurality of encoders based on the identified highest video compression quality level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
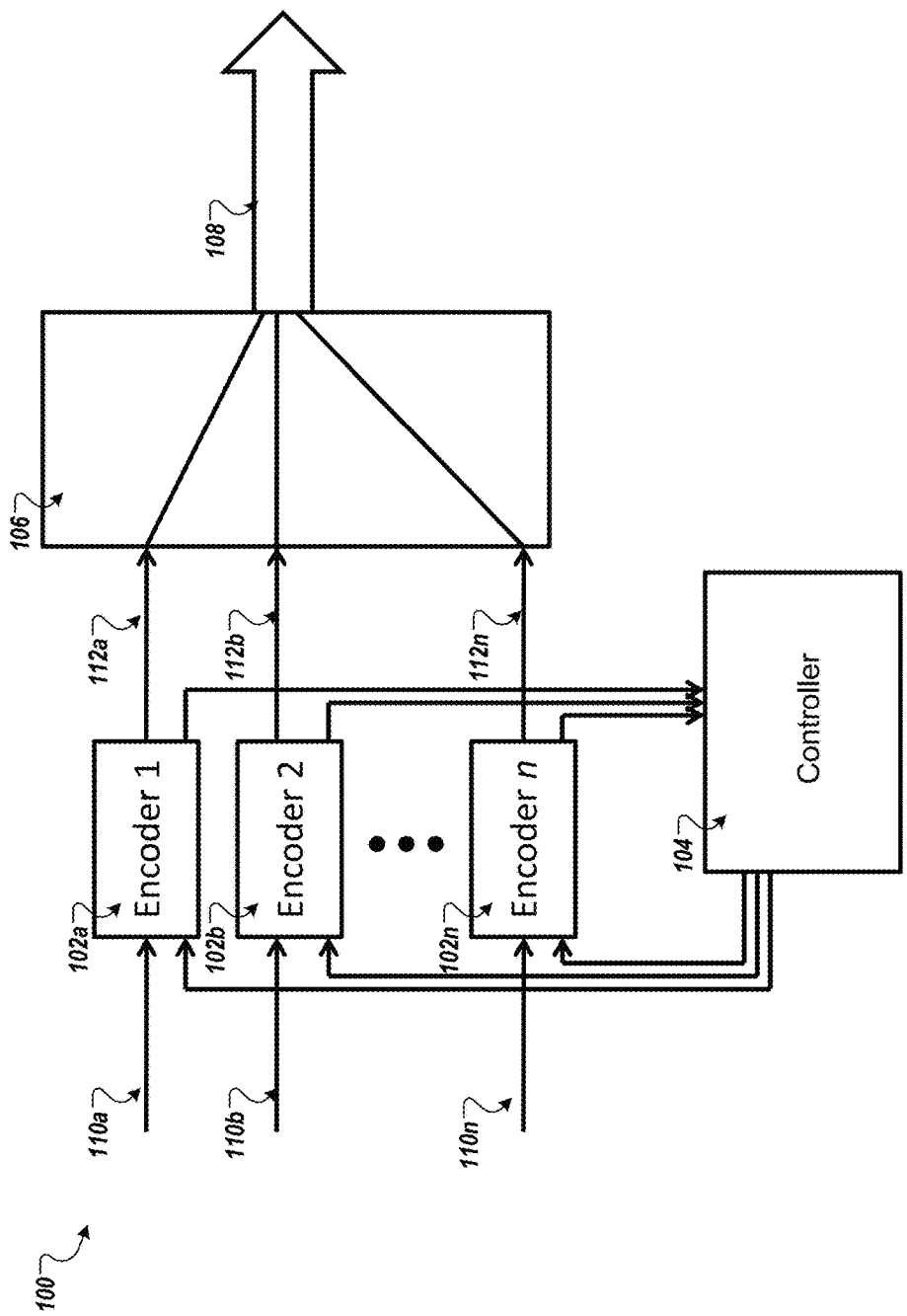
FIG. 1 is an example block diagram of a multi-channel statistical multiplexing system.

Systems, method, and computer program products for providing multi-channel variable bit-rate video compression are described. As will be discussed below, video channels can be allocated with time-varying bit rates that are chosen based on a predefined video compression quality. More specifically, each channel can generate a table describing the set of video compression quality values each corresponding to a bit rate value that can be used to achieve that video compression quality value. This table can be updated frequently, to reflect changes in complexity in the input video signal. To generate the table of pre-compression coding information, encoders of the system described herein can pre-encode each input video signal at multiple, different bit rates, and record the video compression quality value achievable at each of the bit rates. The system also can use lesser number of encoders for pre-encoding. Pre-encoding can be supplemented by data interpolation to generate the pre-compression coding information, requiring less processing but at an expense of lower accuracy.

During operation, each encoder can forward its table describing the pre-compression coding information including a set of bit rates and corresponding video compression quality values to a controller. For example, each encoder can forward the table to the controller prior to or at the time of processing the input signals. Based on all of the tables received from the encoders, the controller can allocate and assign bit rates to each of the individual encoders to ensure that all encoders provide substantially the same video compression quality. The assigned bit-rates can be updated frequently, to reflect updates in the encoders' reported pre-compression coding information. For example, the controller can first identify a highest possible video compression quality value from among all the tables transmitted by the encoders as well as the bit rate required for each encoder to achieve this highest possible video compression quality value. The controller can sum all the bit rates required by the encoders to achieve the identified highest possible video compression quality value. If the sum of the bit rates is less than the total available bit rate, then the controller assigns to each encoder the bit rate that each individual encoder needs to achieve the highest possible video compression quality value.

If the sum of the bit rates is more than the total available bit rate, the controller identifies a lower (e.g., a second highest) video compression quality value, and again, sums all the bit rates required by each video encoder to achieve the next highest possible video compression quality value. These steps can be repeated until the sum of bit rates required to achieve the target quality level is less than the total available bit rate.

Once the target bit rate has been identified, each encoder can encode its individual input video signal, and the encoded signal from each encoder can then be combined with other encoded signals for transmission.

In a statistical multiplexing system, the bit rate allocated to a video channel is a major determinant of the video compression quality. More specifically, a fixed total bandwidth is generally distributed among the encoders in accordance with a characterization of the source video that each encoder processes. The goal of the allocation is to have the resulting the video compression quality the same across all video channels.

Overview

Digitally compressed video can be transmitted (e.g., via MPEG-2 Transport Stream protocol) using two schemes, namely, constant bit rate (CBR) or variable bit rate (VBR). Where CBR compression and transmission is used, a video program can be compressed such that the bit rate (in bits per second) of the compressed video program is constant over time throughout the length of the video program. When sending multiple CBR-compressed video programs over a transmission channel, the video service provider sends as many video programs over the channel as possible such that the sum of all the bit rates of the CBR-compressed video programs is less than the bandwidth of the channel. CBR compression and transmission is easy to manage, but is an inefficient means of sending video over a fixed-rate transmission channel if the goal is to maximize the picture quality of all of the video programs that are sent over that channel. With CBR compression, while the bit rate is constant, the rendered picture quality of the video program can vary over time.

With VBR compression, nearly constant picture quality over time for a video program can be achieved while allowing the bit rate of the compressed video program to vary over time. In such a system, the bit rate allocated to a video channel is a major determinant of the video compression quality. The goal of the allocation is to have the resulting video compression quality the same across all video channels. With VBR compression, the bit rate varies over time because easy scenes (e.g., low-detail or slow action scenes) in the video program generally require less bits for compression to achieve a target picture quality while hard scenes (e.g., high-detail and fast action scenes) require more bits for compression to achieve the same picture quality. When compressed at an average bit rate equal to its CBR-compressed version, the VBR-compressed video program can achieve higher picture quality, because VBR compression allows the bit rate to peak when needed in order to render hard scenes at the target picture quality, while expending less bits for easy scenes so as not to use more bits than necessary to render the target picture quality.

The location of the "peaks" and "valleys" in the bit rate of one video program are typically independent of or uncorrelated with those of another video program, and thus, generally the "peaks" and "valleys" do not align in time from one video program to another. Hence, without coodination, there are instances where the aggregate sum of all the VBR-compressed video programs that are sent in a fixed-rate channel exceeds the fixed rate of the channel. If the aggregate sum is too large to fit within a channel, video data may be dropped from the bitstream or simplified to allow transmission, which reduces the overall video quality as well as the end user viewing experience.

To prevent exceeding the fixed rate of a channel, the VBR controller will typically coordinate operation and assign bit rates so that the total data rate for all programs is within the total available rate. In this way, VBR compression allows higher picture quality to be delivered for all video programs, as compared with CBR compression, where the bit rate is equal to the average bit rate of each of the VBR-compressed versions.

To perform the allocation, conventional techniques characterize the relationship between the assigned bandwidth and the resulting video compression quality, and subsequently allocate the bandwidth based on the set of these individual values across all encoders. Specifically, in the conventional techniques, each encoder provides a single value, also commonly known as the complexity value (e.g., complexity of the encoder's video at that instant in time), that characterizes the relationship between a future assigned bandwidth and the resulting video compression quality. This single value is derived from factors such as spatial complexity, temporal complexity, and motion vector information, and results from a pre-encoding phase. However, a single value is often inadequate for describing this relationship. Specifically, the relationship between bit rate and video compression quality is generally very complex, video-dependent, and bit-rate dependent. As such, it is difficult to establish what video quality could be achieved at any particular bit rate without actually performing compression at that bit rate.

As will be discussed in greater detail below, a system is provided where bit rate allocation can be realized based on a set of parameters for each channel that are provided to a controller during a pre-coding phase (e.g., parameters such as bit rate and video compression quality level). As an example, each parameter (e.g., bit rate) can have a list of values (e.g., 1 Mb/s, 2 Mb/s, . . . ), where each value is associated with a value of another parameter (e.g., video compression quality). These associations are unique to that encoder. As an example, for encoder "1", 1 Mb/s yields "A" video compression quality, and for encoder "2", 1.5 Mb/s yields the same "A" video compression quality. In this example, the controller can identify a particular video compression quality (e.g., "A" video compression quality), and determine what bit rate each individual encoder would need to achieve this quality (e.g., encoder "1" requires 1 Mb/s while encoder "2" requires 1.5 Mb/s). If the bit rates for all of the encoders sum to a total that is less than the total available bit rate, the controller can assign these bit rates to the encoders to perform subsequent encoding.

Example Architecture

Figure 2:
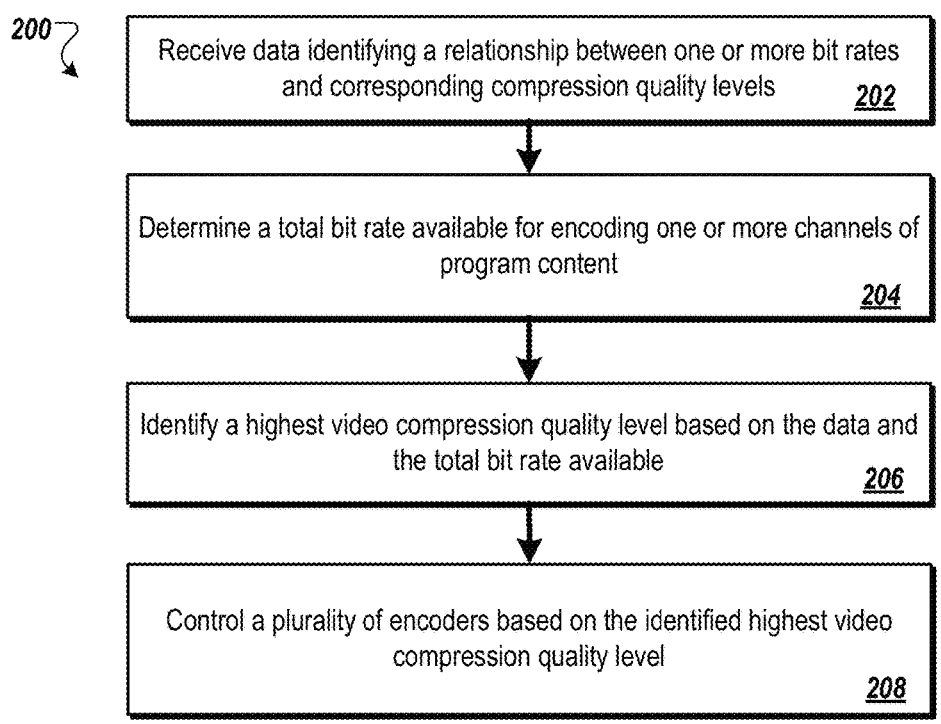
FIG. 2 is an example of a flow chart for controlling encoders of the statistical multiplexing system shown in FIG. 1.

FIG. 1 is an example block diagram of a multi-channel statistical multiplexing system 100 that can be used to provide equal video compression quality across all channels. FIG. 1 is described in conjunction with FIG. 2. FIG. 2 is an example of a flow chart 200 for controlling encoders of the statistical multiplexing system 100 to provide a highest video compression quality level that meets a total bit rate available to the system 100. The operations described in process 200 are not to be construed as necessarily requiring their performance in the particular order discussed or illustrated, unless specifically identified as an order of performance. It is also to be understood that additional or alternative operations may be employed.

A channel is used to transport a bitstream, or a continuous sequence of binary bits used to digitally represent compressed video, audio and/or data. A bit rate is the number of bits per second that is required to transport the bitstream, while a bit error rate is the statistical ratio between the number of bits in error due to transmission and the total number of bits transmitted. A channel capacity is the maximum bit rate at which a given channel can convey digital information with a bit error rate no more than a given value.

Referring to FIG. 2, the process 200 begins with receiving data identifying a relationship between one or more bit rates and corresponding video compression quality levels (202). For example, the multi-channel statistical multiplexing system 100 can include a controller 104 that receives, from a plurality of encoders 102a, 102b, . . . and 102n, data identifying a relationship between one or more bit rates and corresponding video compression quality levels. If desired, other pre-compression coding information describing the uncompressed complexity of the video input also can be produced by the encoders 102a-102n.

The encoders 102a-102n can receive input signals 110a, 110b, . . . 110n that include audio, video and other data. The input signals 110a-110n can be portions of programming to be transmitted to a residential user, for example. Each encoder 102a-102n can compress the input signals 110a-110n, and output a respective compressed bitstream 112a, 112b, . . . 112n in a suitable compression format (e.g., MPEG-2). The encoders 102a-102n can be implemented using hardware and/or software.

To provide the data describing the relationship between one or more bit rates and corresponding video compression quality levels, each encoder 102a-102n can perform a pre-encoding phase on its individual input signal 110a-110n at its respective channel (e.g., with a total of "n" channels where "n" is greater than zero). As used herein, the term "channel" can refer to a path along which data (e.g., image data) is sent from each source (e.g., video source). During a pre-encoding phase each encoder 102a-102n can perform preliminary analysis to determine what video compression quality levels can be achieved at various bit rates. For example, each encoder 102a-102n can encode (e.g., according to the MPEG-2 scheme) an individual input signal 110a-110n a plurality of times each at a different bit rate to generate a table of information identifying the relationship between the bit rates and corresponding video compression qualities. The table of information can then be subsequently used by the controller 104 in identifying the optimum bit rate to be employed for the actual encoding, as will be discussed in greater detail below.

As discussed above, bit allocation can be realized based on a set of parameters for each channel that are provided to a controller during a pre-coding phase. In some implementations, input video signals used in the pre-coding phase can be the same as those used in the encoding phase. In some implementations, the processing requirement used in pre-encoding can be reduced by using a reduced resolution (spatially and/or temporally) version of the input video signals used in the encoding phase. In some implementations, the pre-encoding phase can employ differential input video signals than those used in the encoding phase. In some implementations, the pre-encoding phase can employ the same input video signals than those used in the encoding phase, with a difference being that the pre-coding phase uses multiple passes of pre-encoding, each targeted at a prospective bit rate, while the encoding phase targets a single bit rate ultimately assigned by the controller 104.

In some implementations, the bit allocation also can be realized in real time (e.g., without implementing a pre-coding phase) by performing multiple different coding passes at different bit rates and allowing the controller 104 to select and output the "best fit" coding result.

In general, bit rate information and corresponding video compression quality information, which can be part of the pre-compression coding information provided by the encoders 102a-102n, can be obtained on uncompressed video data. The pre-compression coding information can include additional information such as pre-compression statistics including image by image differences between consecutive video image sequences, average brightness of each video image, noise level, amount of motion, and measures of spatial and temporal complexity.

While the foregoing implementations describe the encoders 102a-102n as generating and providing the table of information containing the pre-compression coding information to the controller 104, the same information can be provided by an external device, which is then forwarded to the encoders 102a-102n to be relayed to the controller 104 or is provided directly to the controller 104.

Identifying and characterizing the relationship between the bit rates and corresponding video compression qualities occurs in advance of actual encoding thereby allowing the system to compress video data with an optimum bit rate that complies with the available bandwidth of the channels while maximizing video quality of the resulting compressed video data. Knowledge of bit rate information and corresponding video compression quality allows the controller 104 to determine the bit rate requirement for each encoder 102a-102n and use the pre-compression coding information to make the video compression quality substantially consistent across all encoders 102a-102n.

Using the pre-compression coding information provided by the encoders 102a-102n allows the controller 104 to adopt a "pre-emptive" policy that makes bit rate assignment decisions based not only on the video data to be immediately transmitted, but also on data to be transmitted ahead in time. Video data transmission in this manner can be used to improve video service quality for an end-user, and to improve bandwidth usage efficiency while maintaining video quality.

At any time before compression, the encoders 102a-102n also can produce, in addition to the pre-compression coding information, data describing the compression complexity of the video data as obtained during or after compression in an earlier cycle. This information can be based on a specific encoding and compression syntax, and can include parameters such as, for example, the number of bits used per picture, measures of the complexity of the raw video data as obtained before compression, and various coding parameters used at a same or different coding condition such as different spatial resolutions of the video data to be encoded. The pre-compression information also can include image spatial complexity, temporal complexity, scene change, fade, wipe, special effects, etc. This information can improve downstream encoding processes in determining better bit usage allocations for video data to ensure consistent video compression quality across all encoders 102a-102n.

In some implementations, the bit rate information contained in the table also can include parameters generated by the encoders 102a-102n before, during, or after the pre-encoding process but are not needed by a typical decoder to perform decoding (e.g., image spatial complexity, temporal complexity, scene change, fade, wipe, special effects). The controller 104 can collect, analyze and process the pre-compression coding information to provide a new or an alternate bit rate to be used by the encoders 102a-102n for encoding the input signals 110a-110n.

At 204, a total bit rate available for encoding one or more channels of program content can be determined. For example, the controller 104 can determine the total bit rate available for encoding one or more channels of program to be encoded by the encoders 102a, 102b, . . . 102n.

In some implementations, the total bit rate available depends on the transmission medium on which the input video signals are to be transmitted. In some implementations, the total bit rate available can be determined externally. For example, the total bit rate can be limited by the data capacity of a satellite or of a video cable, which can be specified to the controller 104. In some implementations, there can be dynamic forces that require the controller 104 to derive or specify the total bit rate available. (E.g., where video and Internet data are sharing the same circuit, increased or decreased demand for Internet data can affect the total bit rate available for the video encoding.)

A highest video compression quality level can be identified based on the data and the total bit rate available (206). For example, the controller 104 determines what new or alternate bit rate is to be used by each encoder 102a-102n for each input signal 110a-110n. As an example, based on the pre-compression coding information received from the encoders 102a-102n, the controller 104 can identify the highest bit rate for each encoder 102a-102n as well as the corresponding video compression quality.

As an example, the controller 104 can determine from the pre-compression coding information provided by the encoders 102a-102n that encoder "1" requires 2 Mb/s to achieve "A" video compression quality, 1.5 Mb/s to achieve "B" video compression quality, and 1 Mb/s to achieve "C" video compression quality for program "1" associated with input signal 110a. Similarly, the controller can determine from the pre-compression coding information that encoder "2" requires 2.5 Mb/s to achieve "A" video compression quality, 2 Mb/s to achieve "B" video compression quality, and 1.5 Mb/s to achieve "C" video compression quality for program "2" associated with input signal 110b.

In this example, to achieve "A" video compression quality, encoder "1" requires 2 Mb/s while encoder "2" requires 2.5 Mb/s. Thus, the total bit rate required for both encoders to achieve "A" video compression quality is 4.5 Mb. The controller 104 then determines whether the total bit rate required to achieve "A" video compression quality exceeds the total available bit rate (e.g., as determined at 204). Using the foregoing example, the controller 104 determines whether the total bit rate of 4.5 Mb exceeds the total available bit rate. Ideally, the total bit rate required to achieve "A" video compression quality complies with the total available bit rate. If the total bit rate required for both encoders to achieve "A" video compression quality does not exceed the total available bit rate, the controller 104 then can ascertain the highest video compression quality that can be achieved without exceeding the total available bit rate as "A" video compression quality.

However, if the total bit rate required for both encoders to achieve "A" video compression quality exceeds the total available bit rate, the controller 104 can determine from the pre-compression coding information the next highest video compression quality that can be achieved by the encoders. Using the example given above, the controller 104 can determine that "B" video compression quality is the next highest video compression quality.

To achieve "B" video compression quality, the controller 104 can identify, from the pre-compression coding information, that encoder "1" requires 1.5 Mb/s while encoder "2" requires 2 Mb/s for a total of 3.5 Mb. The controller 104 can then again determine whether the total bit rate of 3.5 Mb exceeds the total available bit rate. If the total bit rate required for both encoders to achieve "B" video compression quality does not exceed the total available bit rate, the controller 104 then can ascertain the highest video compression quality that can be achieved without exceeding the total available bit rate as "B" video compression quality. If the total bit rate required for both encoders to achieve "B" video compression quality again exceeds the total available bit rate, the controller 104 can determine from the pre-compression coding information the next highest video compression quality that can be achieved by the encoders, which is "C" video compression quality.

If the controller determines that "C" is the highest video compression quality that can be achieved without exceeding the total available bit rate, rather than allocating the rates associated with quality "C," the controller may allocate rates between those associated with qualities "B" and "C," using some common interpolation scheme. Similarly, the controller may use some common extrapolation scheme if the optimal achievable quality appears to be outside the list of qualities provided with the pre-compression coding information.

The controller 104 can repeat the foregoing process until the highest video compression quality that yields a total bit rate that is less than or equal to the total available bit rate has been identified. In so doing, the controller 104 can select a video compression quality for each program to maximize the video compression quality of the transmitted programs while maintaining the total bit rate at or below the total bit rate capacity of the channels.

Conventionally, statistical multiplexing VBR video systems use suboptimal methods to allocate bit-rate to a plurality of channels. This causes the system to deliver fluctuating and suboptimal video quality. Because the controller 104 determines the highest video compression quality allowed under the current total bit rate constraint before actual encoding, no packet will be dropped while maintaining a satisfactory and consistent video quality across all channels.

At 208, a plurality of encoders can be controlled based on the identified highest video compression quality level. Using the example given above, the controller 104 can assign a bit rate of 2 Mb/s to encoder "1" and 2.5 Mb/s to encoder "2" to achieve "A" video compression quality. Similarly, if the controller 104 has determined that the total bit rate required for both encoders to achieve "A" video compression quality exceeds the total available bit rate, the controller 104 can assign a bit rate of 1.5 Mb/s to encoder "1" and 2 MB/s to encoder "2" to achieve "B" video compression quality. If the controller 104 has previously determined that the total bit rate required for both encoders to achieve "B" video compression quality exceeds the total available bit rate, the controller 104 can assign the respective bit rates for achieving "C" video compression quality to the encoders.

As each of the input signals 110a-110n may have dynamically varying characteristics, advance and accurate information generated before final encoding can greatly assist the controller 104 in providing the optimal encoding and bit rate allocation strategies for encoding the input signals 110a-110n. Bit rate assignment in this manner ensures that the total bit rate will not exceed the total available bit rate at any moment while maintaining the same video quality across all channels to improve the end-user viewing experience.

Once the encoders 102a-102n have received their respective bit rate assignment from the controller 104, the encoders 102a-102n can encode the input signals 110a-110n using the bit rates assigned by the controller 104. The encoded bitstreams 112a, 112b, . . . 112n can then be combined by a multiplexer 106 to produce a multiplexed compressed bitstream 108.

Though not shown, the multiplexer 106 also can provide the multiplexed compressed bitstream 108 to a transmitter or router for output over a medium such as a cable or satellite network where the multiplexed compressed bitstream is to be routed to a receiver. Other media such as the Digital Subscriber Line networks (DSL), IP networks and ATM networks as well as communication channels such as any xDSL including ADSL, HDSL, VDSL, SDSL, or terrestrial broadcast networks, also can be used to route the multiplexed compressed bitstream.

In some implementations, in lieu of or in addition to the controller 104, the multiplexer 106 can adjust the bit rate used by the encoders 102a-102n. For example, instead of implementing a controller (e.g., controller 104), the multiplexer 106 can be configured to set a limit for the bit rate used by the encoders 102a-102n, checks the bit rate used by the encoders 102a-102n, and alters the bit rate if the bit rate exceeds a predefined limit.

As shown in FIG. 1, a closed-loop signal path is provided between the controller 104 and the encoders 102a-102n. The signal path provides the controller 104 with a global view of, for example, the bit rate requirements for each of the encoders 102a-102n to achieve a specific video compression quality, and allows communication between the controller 104 and each of the encoders 102a-102n. The encoders 102a-102n can provide compressed video, audio and data bitstreams to the multiplexer 106, which schedules the compressed bitstreams to output to a transmitter or router as previously discussed.

In some implementations, each of the encoders 102a-102n has little to no knowledge of the bandwidth requirements of data being encoded by other encoders 102a-102n. In some implementations, the encoders 102a-102n can rely on messages sent by the controller 104 or other encoders 102a-102n to determine the pre-compression coding information as well as the bit rate which each of the respective encoders 102a-102n is to employ for encoding. These messages can include bit rate assignment from the controller 104 for controlling the bit rates of the encoders 102a-102n. Based on these messages received, the encoders 102a-102n can adjust their encoding bit rate, and encode subsequent input signals 110a-110n based on the new adjusted bit rate.

For simplicity, FIG. 1 shows only the encoders 102a-102n, controller 104, and multiplexer 106. However, the multi-channel statistical multiplexing system 100 also can include additional components such as input buffers (e.g., buffers to receive the encoded data from the encoders 102a-102n) and output buffers (e.g., buffers to receive the multiplexed compressed bitstream 108 output from the multiplexer 106). For example, the multiplexer 106 multiplexes the "n" channels of encoded compressed data. An output buffer then holds the multiplexed data delivered from the multiplexer 106 to be routed to a transmitter or router.

While the foregoing implementations describe obtaining data pertaining to bit rate information and corresponding video compression quality during a pre-encoding phase, these data also can be acquired during the actual encoding phase where compression of the video data takes place. The video compression can utilize one of the existing international standards, which include MPEG-1, MPEG-2, MPEG-4, H.261, H.262, H.263, and H.264. These standardized compression schemes rely on algorithm schemes such as motion compensated transform coding (e.g., DCT transforms or wavelet/sub-band transforms), quantization of the transform coefficients, and variable length coding (VLC). The motion compensated encoding removes the temporally redundant information inherent in video sequences, while the transform coding enables orthogonal spatial frequency representation of spatial domain video signals, and quantization of the transformed coefficients reduces the number of levels required to represent a given digitized video. The use of variable length coding (VLC) allows the most frequently used symbols to be represented by the shortest code words.

In general, the number of bits used to represent a given image determines the quality of the decoded picture. The more bits used to represent a given image, the better the image quality. The encoders 102a-102n can use any of these schemes to compress digitized video sequence. As discussed above, the pre-compression coding information provided by each encoder 102a-102n can include bit rate information, corresponding video compression quality, as well as other similar information describing compression of the video data by the encoder 102a-102n such as information describing the coding parameters at same or different coding conditions for compressed bitstream as produced before, during, or after encoding.

For example, the bit rate information can include coding statistics information generated during the encoding process. The coding statistics information can include parameters such as, for example, a video image compression complexity, a picture coding type, the number of bits used in coding the pictures, a general measure of the amount of motion, and impending picture information. Where MPEG is used for compression, the video image compression complexity can be, for example, measured as the multiplication of the quantization value of the coded video data and the number of bits used to code the picture. The picture coding type refers to the specific format used to compress the picture. The number of bits used in coding the pictures can be provided, for example, for a number of pictures in a time-window of the near future. The general measure of the amount of motion can be measured in, for example, arithmetic and/or absolute sums of all motion vectors in one or more video frames. Impending picture information can include the location of fades, scene cuts, panning action, wipes, etc., as well as any impending high motion and texture content.

In some implementations, the pre-compression coding information also can include motion measure information. Motion measure information can be used to describe the amount of motion in a video sequence. In the case of MPEG based video compression, the motion measure can be defined as the sum of a set of motion vectors. There can be a close correlation between the motion vectors and the direction of the actual motion within the video sequence. However, motion estimation in MPEG video compression is not intended to estimate the motion content of the video data, but to minimize the difference between the reference frame and the motion estimated frame. Typically, the motion vectors do not necessarily point to the direction of motion but to the direction of the motion estimated macroblock with the smallest residual difference. Motion measure information allows the controller 104 to make better decision in determining which video compression quality is best for the encoders 102a-102n.

Special effect information such as scene cuts and fades are commonly found in a video sequence and are usually used during a transition in the video sequence. In general, human vision tolerates more visual artifacts during these transitions. However, when a video compressor encodes the video data during a special effect, more bits are typically used for the corresponding coded picture. Within the compressed bitstream, it is generally difficult to obtain information about the special effect without computationally expensive complete decoding and re-encoding. In some implementations, the pre-compression coding information also can include special effect information and can be provided to the controller 104 to eliminate the need for the often expensive processing required to obtain special effect information, while allowing the controller 104 to adopt a more or less aggressive video compression quality in real time that is appropriate for a particular scene.

As discussed above, the pre-compression coding information can include information relating to the video data before (and/or during and/or after) encoding. For example, the pre-compression coding information also can include a complexity measure, a quantization measure and a number of coded macroblocks. The complexity measure refers to how complex an underlying video image is and can be obtained directly from the uncompressed video sequences before encoding. The complexity measure can be used by the controller 104 to determine how many bits are need to allocate to the recoded pictures. Similar analysis may be performed by the controller 104 for the quantization measure and the number of coded macroblocks. These parameters, either alone or in combination, when obtained in advance by the controller 104, allow the controller 104 to determine, in real time, the optimal bandwidth allocation for compressed bitstreams without exceeding the total bit rate available to the channels.

In some implementations, the pre-compression coding information can be retrieved in real time to allow the controller 104 to assign an appropriate bit rate to each encoder 102a-102n on the fly. In some implementations, in lieu of the pre-compression coding information, the encoders 102a-102n can provide the encoded bitstreams 112a-112n to the controller 104 or an external device for storage. While the encoded bitstreams 112a-112n are stored, the controller 104 can extract, for example, the bit rate information and corresponding video compression quality information from the encoded bitstreams 112a-112, and generate the pre-compression coding information on its own without the need to receive this information from the encoders 102a-102n.

Example Computer System

Figure 3:
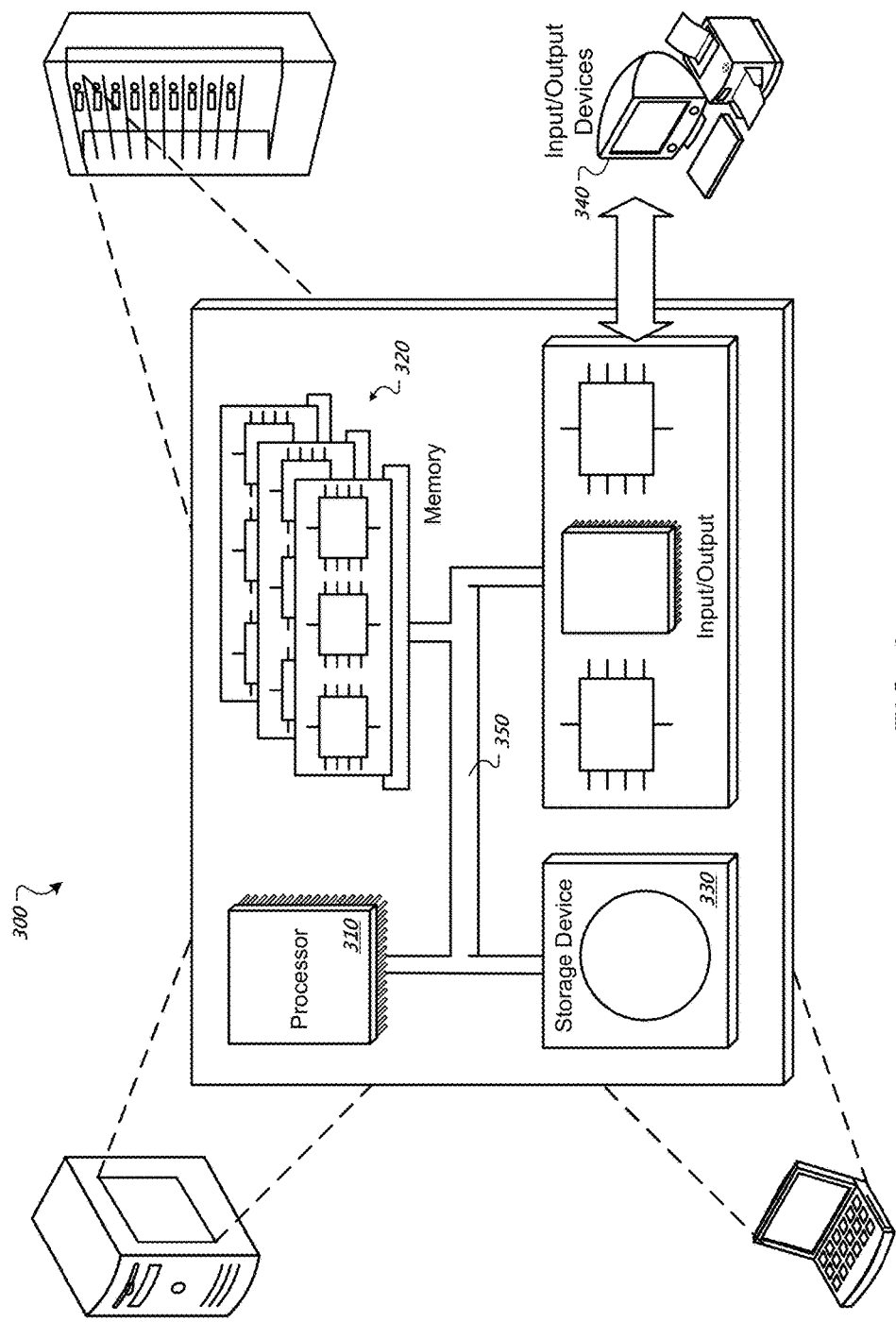
FIG. 3 is a block diagram of a processing device that may be used to execute methods and processes disclosed herein.

FIG. 3 is a block diagram of generic processing device that may be used to execute methods and processes disclosed herein. The system 300 may be used for the operations described in association with the method 300 according to one implementation. The system 300 may also be used for the operations described in association with process 200 according to another implementation.

The system 300 includes a processor 310, a memory 320, a storage device 330, and an input/output device 340. Each of the components 310, 320, 330, and 340 are interconnected using a system bus 350. The processor 310 is capable of processing instructions for execution within the system 300.

In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In some implementations, the memory 320 is a computer-readable medium. In some implementations, the memory 320 is a volatile memory unit. In other implementations, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The features described may be implemented in digital electronic circuitry, or in computer hardware, firmware, software, or in combinations of them. In some implementations, the apparatus may be implemented in a computer program product tangibly (e.g., non-transitory) embodied in an information carrier, e.g., in a machine-readable storage device, for execution by a programmable processor; and method steps may be performed by a programmable processor executing a program of instructions to perform functions of the described implementations by operating on input data and generating output. In other implementations, the apparatus may be implemented in a computer program product tangibly embodied in an information carrier for execution by a programmable processor. In some implementations, the information carrier can include a propagated signal.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The term "system" encompasses all apparatus, devices, and machines for processing data, including by way of example a programmable processor, a computer, or multiple processors or computers. The system can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims.

What is claimed is:

1. A system comprising:
   a plurality of encoders each providing, to a controller, pre-compression coding data for a channel of program content that identifies a relationship between (a) one or more bit rates and (b) corresponding video compression quality levels, wherein the pre-compression coding data is generated at each of the plurality of encoders by said each encoder encoding a reduced resolution version of said channel of program content a plurality of times at a different bit rate; and
   the controller that:
      receives, from each of the plurality of encoders, the pre-compression coding data;
      determines a total bit rate available for the system;
      identifies, for each of the plurality of encoders, a highest video compression quality level based on (a) the pre-compression coding data, including said parameters, and (b) the total bit rate available; and
      instructs each of the plurality of encoders, which sent said pre-compression coding data, to use a particular highest video compression quality level identified for that encoder.

2. The system of claim 1, wherein the plurality of encoders each receive uncompressed channels of program content.

3. The system of claim 1, wherein the relationship identifies a plurality of bit rates and corresponding video compression quality levels each achievable at a respective bit rate.

4. The system of claim 3, wherein the controller further:
   identifies a first video compression quality level, determines, from the pre-compression coding data, a corresponding bit rate required to achieve the first video compression quality level for each encoder; and identifies the first video compression quality level as the highest video compression quality level if the sum of the bit rates required to achieve the first video compression quality level for the plurality of encoders is less than or equal to the total bit rate available.

5. The system of claim 4, wherein the controller further: identifies a second video compression quality level that is of a lesser quality than the first video compression quality level if the sum of the bit rates required to achieve the first video compression quality level for the plurality of encoders is greater than the total bit rate available.

6. The system of claim 5, wherein the controller further: determines a corresponding bit rate required to achieve the second video compression quality level for each encoder; and identifies the second video compression quality level as the highest video compression quality level if the sum of the bit rates required to achieve the second video compression quality level for the plurality of encoders is less than or equal to the total bit rate available.

7. The system of claim 5, wherein the controller further: identifies a third video compression quality level that is of a lesser quality than the first video compression quality level but better quality than the second video compression quality level if the sum of the bit rates required to achieve the first video compression quality level or the second video compression quality level for the plurality of encoders is greater than the total bit rate available.

8. The system of claim 1, wherein the controller controls at least two of the plurality of encoders to achieve the identified highest video compression quality level but at a different bit rate.

9. The system of claim 1, wherein the controller: determines, for each encoder, a bit rate corresponding to the identified highest video compression quality level; and assigns the determined bit rate to each encoder to achieve the identified highest video compression quality level.

10. The system of claim 9, wherein the assigned bit rates are different for at least two of the plurality of encoders.

11. The system of claim 9, wherein at least two encoders encode respective one or more channels of program content based on the assigned bit rate, the assigned bit rate being fixed and constant.

12. The system of claim 11, further comprising: a multiplexer to receive two or more channels encoded based on the assigned bit rate from the plurality of encoders and to aggregate the two or more encoded channels to produce compressed video data.

13. The system of claim 11, wherein each encoder generates a table comprising the pre-compression coding data that describes each bit rate and corresponding video compression quality level.

14. A method comprising:
receiving, from each of a plurality of encoders, pre-compression coding data identifying a relationship between (a) one or more bit rates and (b) corresponding video compression quality levels, wherein the pre-compression coding data is generated at each of the plurality of encoders by said each encoder encoding a reduced resolution version of said channel of program content a plurality of times at a different bit rate;

determining a total bit rate available for encoding one or more channels of program content;

identifying a highest video compression quality level based on (a) the pre-compression coding data, including said parameters, and (b) the total bit rate available; and instructing each of a plurality of encoders, which sent said pre-compression coding data, to use a particular highest video compression quality level identified for that encoder.

15. The method of claim 14, further comprising receiving uncompressed channels of program content,
wherein receiving pre-compression coding data includes receiving the uncompressed channels encoded a plurality of times, each time at a different bit rate to provide a plurality of corresponding video compression quality levels each achievable at a respective bit rate from which the relationship is identified.

16. The method of claim 14, further comprising:
identifying a first video compression quality level;
determining, from the pre-compression coding data, a corresponding bit rate required to achieve the first video compression quality level for each encoder; and
identifying the first video compression quality level as the highest video compression quality level if the sum of the bit rates required to achieve the first video compression quality level for the plurality of encoders is less than or equal to the total bit rate available.

17. The method of claim 16, further comprising:
identifying a second video compression quality level that is of a lesser quality than the first video compression quality level if the sum of the bit rates required to achieve the first video compression quality level for the plurality of encoders is greater than the total bit rate available.

18. The method of claim 17, further comprising:
determining a corresponding bit rate required to achieve the second video compression quality level for each encoder; and
identifying the second video compression quality level as the highest video compression quality level if the sum of the bit rates required to achieve the second video compression quality level for the plurality of encoders is less than or equal to the total bit rate available.

19. The method of claim 17, further comprising:
identifying a third video compression quality level that is of a lesser quality than the first video compression quality level but better quality than the second video compression quality level if the sum of the bit rates required to achieve the first video compression quality level or the second video compression quality level for the plurality of encoders is greater than the total bit rate available;
determining a corresponding bit rate required to achieve the third video compression quality level for each encoder; and
identifying the third video compression quality level as the highest video compression quality level if the sum of the bit rates required to achieve the third video compression quality level for the plurality of encoders is less than or equal to the total bit rate available.

20. The method of claim 14, wherein controlling the plurality of encoders includes controlling at least two of the plurality of encoders to achieve the identified highest video compression quality level but at a different bit rate.

21. The method of claim 14, further comprising:
determining, for each encoder, a bit rate corresponding to the identified highest video compression quality level; and
assigning the determined bit rate to each encoder to achieve the identified highest video compression quality level.

22. The method of claim 21, wherein assigning the determined bit rate includes assigning a different bit rate for at least two of the plurality of encoders.

23. The method of claim 22, further comprising:
multiplexing two or more channels encoded based on the assigned bit rate from the plurality of encoders to produce compressed video data.

24. A system comprising:
a plurality of encoders each providing, in real time, coding data identifying a relationship (a) between a plurality of bit rates and (b) corresponding video compression quality levels, wherein the coding data is generated at each of the plurality of encoders by said each encoder encoding a reduced resolution version of said channel of program content a plurality of times at a different bit rate; and
a controller that:
receives, from each of the plurality of encoders, the coding data;
identifies, for each of the plurality of encoders, a video compression quality level based on (a) the coding data, including said parameters, and (b) a total bit rate available for transmission in a transmission medium through which program content encoded by the plurality of encoders are to be transmitted; and
instructs each of the plurality of encoders, which sent said pre-compression coding data, in real time based on the identified video compression quality level for each encoder.

25. The system of claim 1, wherein the reduced resolution version of said channel of program content possesses a reduced spatial resolution compared to said program content.

26. The system of claim 1, wherein the reduced resolution version of said channel of program content possesses a reduced temporal resolution compared to said program content.

* * * * *